United States Patent [19]
Tarolli et al.

[11] Patent Number: 5,870,102
[45] Date of Patent: Feb. 9, 1999

[54] TEXTURE COMPOSITING APPARATUS AND METHOD

[75] Inventors: Gary Tarolli, Concord, Mass.; Scott Sellers, Menlo Park; James E. Margeson, III, Santa Clara, both of Calif.

[73] Assignee: 3Dfx Interactive, Incorporated, San Jose, Calif.

[21] Appl. No.: 57,329

[22] Filed: Apr. 8, 1998

Related U.S. Application Data

[63] Continuation of Ser. No. 552,740, Nov. 3, 1995, Pat. No. 5,740,343.

[51] Int. Cl.$^6$ .................................................. G06T 11/40
[52] U.S. Cl. ................................. 345/430; 345/501
[58] Field of Search ............................. 345/430, 431, 345/426, 501–2, 506, 522–4; 358/518

[56] References Cited

U.S. PATENT DOCUMENTS

| | | | |
|---|---|---|---|
| 4,855,934 | 8/1989 | Robinson | 364/521 |
| 4,974,176 | 11/1990 | Buchner et al. | 364/522 |
| 5,063,375 | 11/1991 | Lien et al. | 340/703 |
| 5,185,856 | 2/1993 | Alcorn et al. | 395/130 |
| 5,268,996 | 12/1993 | Steiner et al. | 395/126 |
| 5,327,509 | 7/1994 | Rich | 382/108 |
| 5,361,386 | 11/1994 | Watkins et al. | 395/130 |
| 5,422,997 | 6/1995 | Nagashima | 395/516 |
| 5,438,654 | 8/1995 | Drebin et al. | 395/139 |
| 5,459,823 | 10/1995 | Silverbrook et al. | 395/131 |
| 5,463,728 | 10/1995 | Blahut et al. | 395/344 |
| 5,469,536 | 11/1995 | Blank | 395/131 |
| 5,471,572 | 11/1995 | Buchner et al. | 395/139 |
| 5,544,291 | 8/1996 | Gilley et al. | 395/123 |
| 5,548,709 | 8/1996 | Hannah et al. | 395/510 |
| 5,579,456 | 11/1996 | Cosman | 395/128 |
| 5,594,854 | 1/1997 | Baldwin et al. | 395/141 |
| 5,740,343 | 4/1998 | Tarolli et al. | 395/130 |
| 5,760,783 | 6/1998 | Migdal et al. | 345/430 |
| 5,798,762 | 8/1998 | Sfarti et al. | 345/420 |

OTHER PUBLICATIONS

Williams, Lance, "Pyramidal Parameters", *ACM Computer Graphics*, vol. 17, No. 3, Jul. 1983.
Herbert, "Survey of Texture Mapping", *IEEE—Proc. Graphics Interface 86*, Nov. 1986.

*Primary Examiner*—Rudolph J. Buchel, Jr.
*Attorney, Agent, or Firm*—Crosby, Heafey, Roach & May

[57] ABSTRACT

A texture compositing apparatus and method for combining multiple independent texture colors in a variety of ways in a single execution pass using a single texture compositing unit (TCU) per texture. The TCU receives a control signal, a blend factor, a local data signal($C_{local}/A_{local}$) and an output data signal ($C_{in}/A_{in}$) generated by another TCU, the local data signal and the output data signal represent a texture color in a RGBA format. Based upon the control signal, the TCU can generate an output signal based on a variety of functions. The outputs that can be generated include but are not limited to: (1) zero; (2) one; (3) $C_{in}$; (4) $C_{local}$; (5) $C_{in}+C_{local}$; (6) $C_{in}-C_{local}$; (7) $C_{in}*C_{local}$; (8) $C_{in}*C_{local}+A_{local}$; (9) $C_{in}*A_{local}+C_{local}$; (10) $(C_{in}-C_{local})*F_{blend}+C_{local}$; and (11) $(C_{in}-C_{local})*(1-F_{blend})+C_{local}$. Another feature of the invention is that multiple TCUs can be serially coupled to enable additional texture colors to be combined in a single execution path.

29 Claims, 7 Drawing Sheets

TEXTURE COMPOSITING APPARATUS AND METHOD

RELATED APPLICATIONS

This application is a continuation of U.S. patent application Ser. No. 08/552,740 which was filed with the U.S. Patent and Trademark Office on Nov. 3, 1995, now U.S Pat. No. 5,740,343.

BACKGROUND OF THE INVENTION

1. Field of the Invention

The present invention relates generally to the field of image processing, and more particularly to an apparatus for combining texel images to generate graphics images.

2. Description of Background Art

Recent advances in computer performance has enabled graphics systems to provide more realistic graphical images using personal computers and home video game computers. In such graphics systems, some procedure must be implemented to "render" or draw graphics primitives to the screen of the system. "Graphics primitives" are a basic component of a graphics picture, such as a polygon, e.g., a triangle, or a vector. All graphics pictures are formed with combinations of these graphic primitives. Many procedures may be utilized to perform graphics primitives rendering.

Conventional graphics systems perform these graphics rendering procedures using a frame buffer. A frame buffer generally comprises a plurality of computer memory chips that store information concerning pixel activation on the system's display screen. Generally, the frame buffer includes all of the graphics data information that will be written onto the screen.

Early graphics systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or function onto a surface in three dimensions. Texture mapping is a relatively efficient technique for creating the appearance of a complex image without the tedium and computational cost of rendering three dimensional detail that might be found on a surface of an object.

Many parameters have been texture mapped in conventional systems. Some of these parameters include surface color, specular reflection, normal vector perturbation, specularity, transparency, diffuse reflections, and shadows. In texture mapping, a source image known as the "texture" is mapped onto a surface in three dimensional space. The three dimensional surface is then mapped to the destination image, that is typically a graphics display screen. Examples of the texture of an object include the gravel on a highway or scuff marks on a wooden surface.

In conventional systems a texture is frequently combined with either a constant color or an iterated color. That is, in conventional systems multiple texture colors are not combined in a single execution pass. Examples of the types of combinations or functions available in conventional systems between the texture and the constant color or the iterated color include a multiply function, an addition function, and a subtraction function. In some conventional systems each of these functions are performed in a separate chip, in other conventional systems these functions are performed in parallel using multiple chips. In such conventional systems, having chips capable of performing a single function is an inefficient use of space. In addition, having functions performed in parallel, e.g., trilinear mipmapping, is expensive because memory is not used efficiently. For example, in order to implement trilinear mipmapping in a conventional system using parallel processing, a single mipmap is stored multiple times, i.e., once in each chip. Trilinear mipmapping is described in greater detail below.

What is needed is a graphical system that (1) permits texture images to be combined with other texture images and (2) is scalable, that is, multiple texture combine units can be serially coupled such that many texture images can be combined in a single execution pass, where each texture combine unit is capable of creating a new texture image by combining two input texture images.

SUMMARY OF THE INVENTION

The present invention is a texture compositing apparatus and method for combining multiple independent texture colors in a variety of ways in a single execution pass using a single texture compositing unit (TCU) per texture. The TCU receives a control signal, a blend factor, a local data signal ($C_{local}/A_{local}$), and an output data signal ($C_{in}/A_{in}$) generated by another TCU, the local data signal and the output data signal represent a texture color in a RGBA format. Based upon the control signal, the TCU can generate an output signal based on a variety of functions. The outputs that can be generated include: (1) zero; (2) one; (3) $C_{in}$; (4) $C_{local}$; (5) $C_{in}+C_{local}$; (6) $C_{in}-C_{local}$; (7) $C_{in}*C_{local}$; (8) $C_{in}*C_{local}+A_{local}$; (9) $C_{in}*A_{local}+C_{local}$; (10) $(C_{in}-C_{local})*F_{blend}+C_{local}$; and (11) $(C_{in}-C_{local})*(1-F_{blend})+C_{local}$. Another feature of the invention is that multiple TCUs can be serially coupled to enable additional texture colors to be combined in a single execution path.

More particularly, the present invention describes and claims an apparatus for receiving a source image signal and a plurality of texture signals each representing a texture and combining the source image signal with signals representing at least two of the textures during a single pixel rendering pass. The apparatus according to a preferred embodiment of the invention comprises a first texture composite unit, disposed to receive the source image signal and a first texture signal of the plurality of texture signals, the source image signal and the first texture signal representing independent textures, and a first control signal representing a first relationship between the source image signal and the first texture signal, for combining the source image signal and the first texture signal in accordance with the first relationship to generate a first output texture signal, a second texture composite unit, disposed to receive the first output texture signal, a second texture signal of the plurality of texture signals, and a second control signal representing a second relationship between the first output texture signal and the second texture signal, for combining the first output texture signal and the second texture signal in accordance with the second relationship to generate a second output texture signal, wherein the second output texture signal is generated from the source image signal, the first texture signal, and the second texture signal in a single pixel rendering pass.

In the preferred embodiment, the source image signal and the first texture signal each include four component signals, namely, a red color signal, a green color signal, a blue color signal, and an alpha color signal. Each texture composite unit further comprises four texture combine subunits, each texture combine subunit associated with one of the four component signals, and each of the texture combine subunits having a first blend factor determinator, a blending unit, and an addition unit. Each of the texture combine subunits receives a control signal, and performs at least one of the blend function and the add function in response to the control signal in a single pixel rendering pass. Two or more of the texture combine subunits receive a first control signal and perform at least one of the blend function and the add function in response to the first control signal in a single pixel rendering pass. Additional texture composite units can be sequentially connected such that one additional texture signal is combined by each additional texture composite unit during a single pixel rendering pass.

The source image signal comprises a source image color signal and a source image alpha signal and the first texture signal comprises a first texture color signal and a first texture alpha signal. The apparatus according to a preferred embodiment of the invention further comprises a subtraction unit, having the source image color signal and the first texture color signal as inputs, for subtracting the source image color signal from the first texture color signal. Also included are a multiplication and add unit, for multiplying the first texture signal with one of the source image color signal, the first texture alpha signal, the second texture alpha signal, and a level-of-detail signal, and adding one of the source image color signal and a third signal. A multiplication unit is included for multiplying the first texture color signal and one of the source image color signal, the first texture alpha signal, the second texture alpha signal, and a level-of-detail signal. A constant generating unit generates a signal representing a predefined value. A pass-through unit, coupled to the source image signal, outputs the source image signal.

A first storage unit coupled to the first texture composite unit and a second storage unit coupled to the second texture composite unit separately store representations of a first mipmap level and a second mipmap level, respectively. The first texture composite unit includes a first blend factor determinator, for determining a first blend factor, the first blend factor representing a blending relationship between the source image signal and the first texture signal, a first blending unit, coupled to the first blend factor determinator, for blending the source image signal and the first texture signal based upon the first blend factor, and a first addition unit, having the source image signal and the first texture signal as inputs, for adding the first output texture signal and the first texture signal. The blending factor is equal to a selected composite factor representing one of the first mipmap level and a mid-level mipmap level between the first mipmap level and the second mipmap level, the source image color signal representing the first mipmap level, the first texture color signal representing the second mipmap level.

The present invention further encompasses a computer based method for combining at least two texture signals, in a single pixel rendering pass, the computer having a first texture composite unit and a second texture composite unit, comprising the steps of (a) receiving a source image signal, (b) receiving a first texture signal representing independent textures, (c) receiving a first control signal representing a first relationship between the source image signal and the first texture signal, and (d) combining the source image signal and the first texture signal in accordance with the first relationship to generate a first output texture signal, (e) receiving a second texture signal, (f) receiving a second control signal representing a second relationship between the first output texture signal and the second texture signal, and (g) combining the first output texture signal and the second texture signal in accordance with the second relationship to generate a second output texture signal wherein the second output texture signal is generated from the source image signal, the first texture signal, and the second texture signal in a single pixel rendering pass. The first and second control signals can be either the same or different. In the preferred embodiment, the steps (e)–(g) are sequentially repeated such that one additional texture is combined by each repetition of steps (e)–(g) during a single pixel rendering pass. The second relationship can be represented by at least one of a blending operation, a multiplication operation, a subtraction operation, and an additional operation.

Further steps according to the method of the invention include determining a blend factor representing a relationship between the source image signal and the first texture signal, and performing one of a blending operation and an addition operation in a single texture rendering pass in response to the second control signal, the blending operation combining the source image signal and the first texture signal according to the blend factor, the addition operation adding the source image signal to the first texture signal to generate the first texture output signal. Also included is the step of performing a subtraction operation on the source image signal and the first texture signal in response to the first control signal. As stated above, the source image signal comprises a source image color signal and a source image alpha signal, the first texture signal comprises a first texture color signal and a first texture alpha signal, the second texture signal comprises a second texture color signal and a second texture alpha signal, and the method according to the invention comprises the further steps of performing a multiplication operation on the first texture color signal and one of the source image color signal, the source image alpha signal, the first texture alpha signal, and a level-of-detail signal in response to the first control signal. One of a binary one signal and a binary zero signal is generated in response to the first control signal.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1:
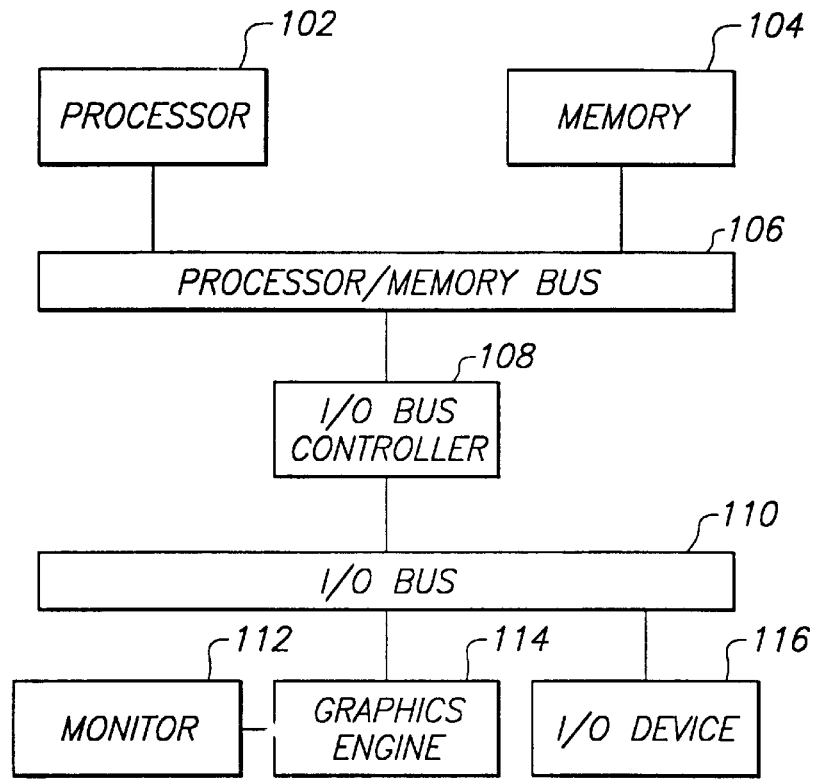
FIG. 1 is an illustration of a computer system in which the preferred embodiment of the present invention operates.

FIG. 1 is an illustration of a computer system 100 in which the preferred embodiment of the present invention operates. In the preferred embodiment, the computer system 100 is a conventional personal computer, e.g., an IBM compatible personal computer. In an alternate embodiment the computer system is a video game platform, e.g., a Nintendo game platform, commercially available from Nintendo of America, Inc., Redmond, Wash. In the preferred embodiment the processor 102 of the computer system 100 is a Pentium processor, commercially available from INTEL Corporation, Santa Clara, Calif. The memory 104 is conventional random access memory (RAM). The processor/memory bus 106 and the input/output (I/O) bus 110 are conventional. A conventional I/O bus controller 108 controls the data flow between the I/O bus 110 and the processor/memory bus 106. Conventional input/output devices 116, e.g., a keyboard, is connected to the I/O bus 110. A conventional computer monitor 112 is driven by a graphics engine unit 114. The graphics engine unit 114 is described in greater detail below with reference to FIGS. 2–8.

Figure 2:
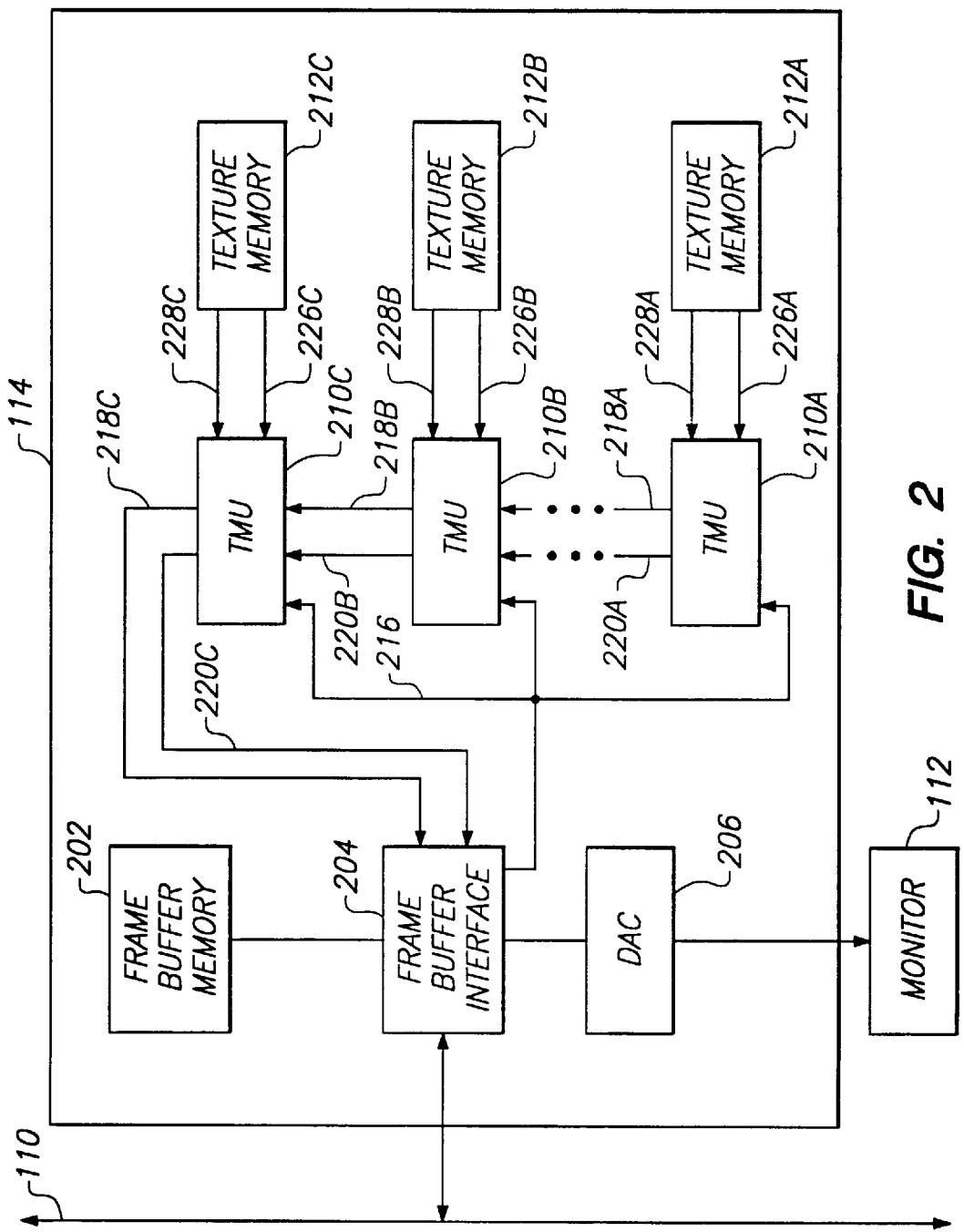
FIG. 2 is an illustration of the graphics engine of the preferred embodiment of the present invention.

FIG. 2 is an illustration of the graphics engine unit 114 of the present invention. A frame buffer interface (FBI) 204 is coupled to the I/O bus 110. The FBI 204 is coupled to a frame buffer memory 202, a conventional digital-to-analog converter (DAC) 206, and one or more texture mapping units (TMU) 210. The DAC 206 is also coupled to the monitor 112. Each TMU 210 is also connected to a texture memory 212. The FBI 204 is an application specific integrated circuit (ASIC) that serves as a I/O slave device, and all communication from the processor 102 to the graphics engine 114 is performed through the FBI 204. The FBI 204 implements basic three dimensional primitives including Gouraud shading, depth buffering, and dithering. The FBI 204 also controls the output to the monitor 112.

The TMU 210 is also an ASIC. The TMU 210 performs composite texture mapping including texture morphing, and trilinear filtering. The operation of the TMU 210 is described in greater detail below with reference to FIGS. 3–8. Preferably, the frame buffer memory 202 and the texture memory 212 are extended-data-out (EDO) dynamic random access memory (DRAM). The TMU 210 receives a control signal CTRL from the FBI 204 via a control signal line 216. In addition, the TMU 210 receives a local texture color/alpha signal from its associated texture memory 212. The local texture color/alpha signal is received via a local texture color signal line 226, and a local texture alpha signal line 228. In addition, each TMU 210 receives a texture color/alpha input signal from a previous, or "upstream", TMU 210. The texture color/alpha input signal is received via the input/output texture color signal line 218, and the input/output texture alpha signal line 220. Each TMU 210 generates a texture color/alpha output signal. This texture color/alpha output signal is transmitted on another input/output texture color line 218 and another input/output alpha texture color line 220. The texture color value generated by the TMU 210C that is the last in the chain of TMU's 210 is transmitted to the FBI 204. The inputs to the TMU 210 and the outputs from the TMU 210 are described in greater detail below with reference to FIG. 3.

Figure 3:
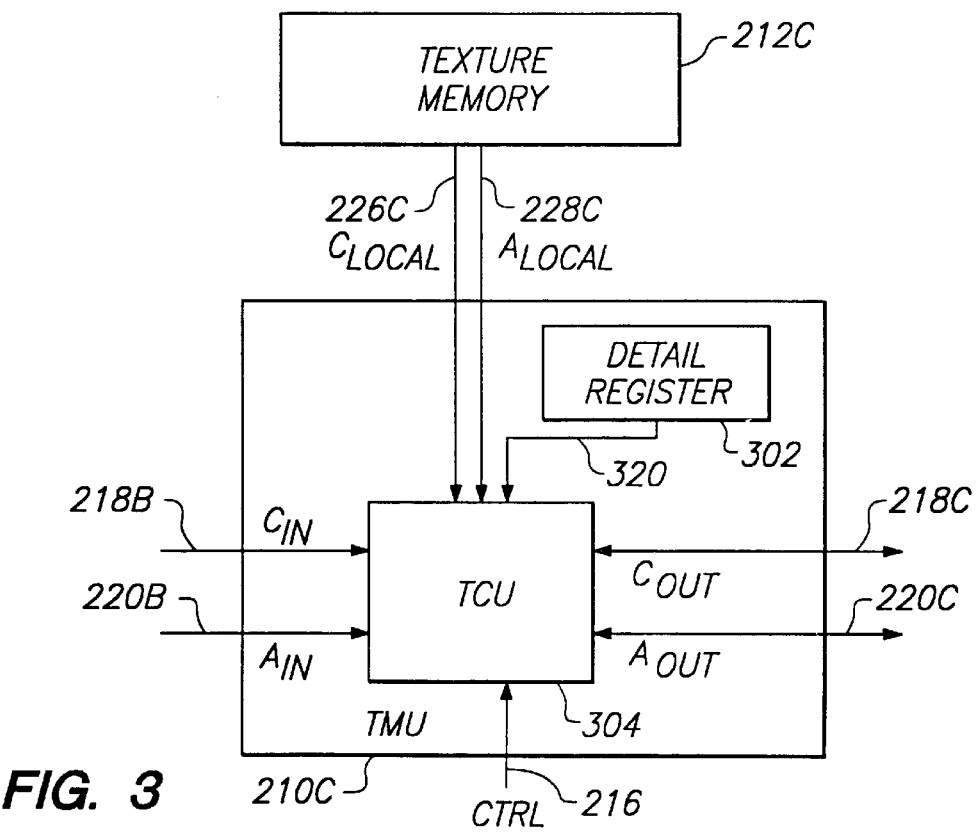
FIG. 3 is an illustration of a texture mapping unit and texture memory according to the preferred embodiment of the present invention.

FIG. 3 is an illustration of a TMU 210 a.nd a texture memory unit 212 of the present invention, and specifically of the TMU 210C and texture 212C. Each TMU 210 includes a texture compositing unit (TCU) 304 and a level of detail (LOD) composite factor register 302. The LOD composite factor register 302 includes information relating to the image's level of detail, as described below. The TCU 304 receives the CTRL signal via the control signal line 216, a texture color input signal, a local texture color signal, a local texture alapha signal, and a data signal. The texture color input signal is comprised of a texture color input signal $C_{in}$ received on the input/output texture color signal line 218 and a texture alpha input signal $A_{in}$ received on the input/output texture alpha signal line 220. The local texture color/alpha signal is comprised of a local texture color signal $C_{local}$ that is received on the local texture color signal line 226 and a local texture alpha signal $A_{local}$ that is received on the local texture alpha signal line 228. The data signal is received from the LOD composite factor register 302 via data line 320. As described above, the texture color/alpha input signal is the texture color/alpha output signal from a previous (upstream) TMU 210, e.g. TMU 210. For the first TMU 210A no texture color/alpha input signal is received. The local texture color/alpha signal is produced from a texture lookup in the texture memory 212. The result is a signal that is, preferably, in a 32 bit red-green-blue-alpha (RGBA) format having 8 bits allocated for each texture color component. The texture color/alpha input signal ($C_{in}$, $A_{in}$), the texture color/alpha output signal ($C_{out}$, $A_{out}$), and the local texture color/alpha signal ($C_{local}$, $A_{local}$) are all in the 32 bit RGBA format. Persons skilled in the relevant art will recognize that each texture color component can be represented by a different number of bits and that different and additional texture colors can be used. In addition to the various texture color signals described above, the TCU 304 receives the control signal CTRL from the FBI 204 via control signal line 216. The operation of the control signal CTRL is described below with reference to FIGS. 5–8.

Figure 4:
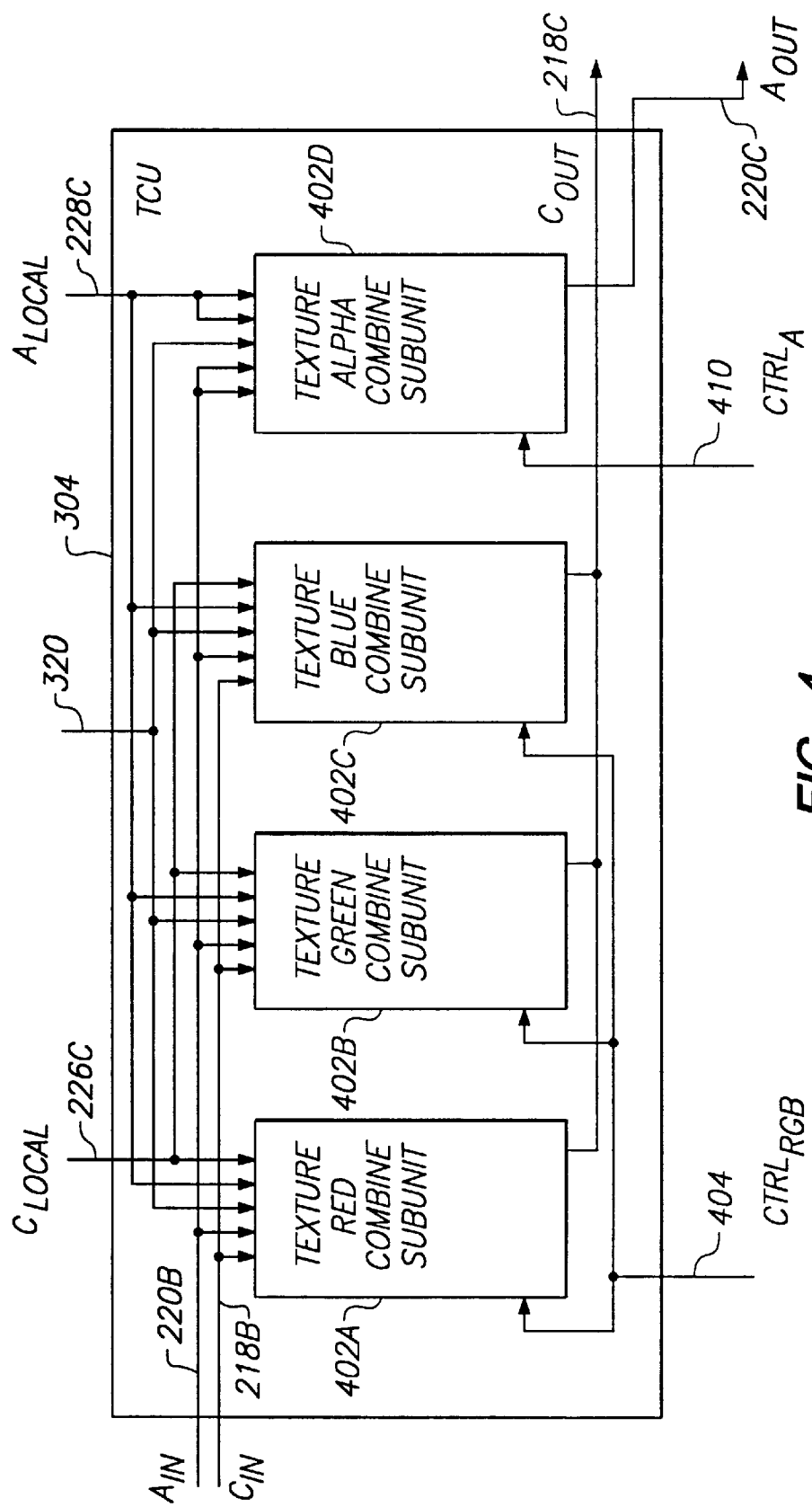
FIG. 4 is an illustration of a texture compositing unit according to the preferred embodiment of the present invention.

FIG. 4 is an illustration of a TCU 304 according to the present invention. The TCU 304 includes identical logic for each of the four color channels of the texture color signal, i.e., red, green, blue, and alpha. The logic for the red color channel is located within a texture red combine sub-unit (TRCU) 402A. The logic for the green color channel is located within a texture green combine sub-unit (TGCU) 402B. The logic for the blue color channel is located within a texture blue combine sub-unit (TBCU) 402C. The logic for the alpha channel is located within a texture alpha combine sub-unit (TACU) 402D. In the preferred embodiment, the TRCU 402A, the TGCU 402B, and the TBCU 402C perform the same functions. Accordingly, the control signal CTRL includes a first set of control bits, $CTRL_{rgb}$, on color control signal line 404 for controlling the functions performed by the TRCU 402A, the TGCU 402B, and the TBCU 402C. The control signal CTRL also includes a second set of control bits $CTRL_a$ for controlling the functions performed by the TACU 402D. The second set of control bits $CTRL_a$ are received on alpha control signal line 410. The control signal line 216 includes the color control signal line 404 and the alpha control signal line 410. In an alternate embodiment each texture combine sub-unit 402 is controlled by independent control signals.

Each TCU 304 receives five data inputs. For the TRCU 402A, TGCU 402B, and the TBCU 402C the inputs are the local texture color/alpha signal comprised of $C_{local}$ and $A_{local}$, the input texture color/alpha signal comprised of $C_{in}$ and $A_{in}$, and a blend factor received via data line 320. In addition to these data signals, these texture combine sub-units 402A, 402B, 402C, receive a first set of control bits $CTRL_{rgb}$, as described above. Similarly, the TACU 402D receives five data inputs. However the data inputs to the TACU 402D differ from the other texture combine sub-units 402. The data inputs to the TACU 402D include the blend factor received via data line 320, two copies of the input texture alpha signal $A_{in}$ and two copies of the local texture alpha signal $A_{local}$. That is, the TACU 402D does not require the input texture color signal $C_{in}$ or the local texture color signal $C_{local}$. In addition to these data signals, the TACU 402D receives a second set of control bits $CTRL_a$, as described above.

Each TCU 304 of the present invention generates a texture color output signal $C_{out}$ and a texture alpha output signal $A_{out}$ from the input signals described above based upon at least the following functions (or their equivalents):

(1) zero;

(2) one;

(3) $C_{in}$;

(4) $C_{local}$;

(5) $C_{in}+C_{local}$;

(6) $C_{in}-C_{local}$;

(7) $C_{in}*C_{local}$;

(8) $C_{in}*C_{local}+A_{local}$;

(9) $C_{in}*A_{local}+C_{local}$;

(10) $(C_{in}-C_{local})*F_{blend}+C_{local}$;

(11) $(C_{in}-C_{local})*(1-F_{blend})+C_{local}$.

It will be apparent to persons skilled in the art that other functions or control signals can be used to generate additional output signals. Functions (1)–(11) are useful for combining multiple texture colors. An output of a logical zero or a logical one (functions (1) and (2)) is used for blending texture colors, as described below. The ability to blend a transparent texture color with a base texture color is achieved using the alpha values of the texture color/alpha signals. The ability to generate a signal having a logical zero or a logical one value permits a zero transparency blend or a full transparency blend to be implemented based on the values of the CTRL on line signal 216 and, therefore, does not require the storing of the blending factor $F_{blend}$ in texture memory 212. An output signal that is equal to the texture color input signal $C_{in}$ or the local texture color signal $C_{local}$ (functions (3) and (4)) can be used to distribute these texture maps across multiple TMU chips 210 within the graphics engine 114. Thus the texture map can reside in any TMU chips texture memory 212 and adding additional TMUs 210 to the graphics system increases the total texture memory 212 available in the graphics system.

Generating an output signal by combining the texture color input signal and the local texture color signal, i.e., $C_{in}+C_{local}$, can be used to model a specular or additive lighting effect. An example of a specular lighting effect is a highlight reflected from a shiny object, e.g., an aluminum can. Generating an output signal by subtracting the local texture color signal from the texture color input signal, i.e., $C_{in}-C_{local}$, can be used to model shadows. Generating an output signal by multiplying the texture color input signal and the local texture color signal, i.e., $C_{in}*C_{local}$, can be used to model a diffuse or multiplicative lighting effect. A diffuse lighting effect occurs when the intensity of light reflecting from an object is dependent upon the orientation of the object with respect to a light source. In addition, multiplying the texture color input signal and the local texture color signal can be used to model a filter, such as a red lens or a glass window.

Generating an output signal $C_{out}/A_{out}$ using a multiply and add function models the combination of the multiplicative or diffuse lighting effect and the specular lighting effect, described above. In particular, multiplying the texture color input signal and the local texture color signal and then adding the local texture alpha signal, i.e., $C_{in}*C_{local}+A_{local}$, models a texture color diffuse highlight and a monochrome specular highlight. Similarly, multiplying the input texture color signal by the local texture alpha signal and adding the local texture color signal, i.e., $C_{in}*A_{local}+C_{local}$, models a monochrome diffuse highlight and a texture colored specular highlight effect. It should be noted that with more inputs the TCU 304 could implement color diffuse highlights and color specular highlights simultaneously.

As stated above, a feature of the present invention is that multiple texture colors signals, e.g., $C_{in}$ and $C_{local}$, can be blended together to form a new texture output color signal $C_{out}$ and a new texture output alpha signal $A_{out}$. Accordingly, each TMU 210 can perform composite texture mapping including texture morphing and trilinear mipmapping using functions (10) and (11) set forth above. In composite texture mapping the value of the $F_{blend}$ signal in function (10) or (11) is typically equal to the value of the $A_{in}$ signal, the $A_{local}$ signal, a function of the LOD signal, e.g., f(LOD) signal, or the fractional portion of the LOD signal, e.g., frac(LOD). One example of composite texture mapping is applying a translucent or opaque decal on top of another texture. Rather than rasterizing the decal after a base textured polygon is rendered, as is done in conventional graphics systems, the base texture image and the decal texture image can be combined in one execution pass of the graphics system, where a TCU 304 in a first TMU 210B generates a first texture image and a TCU 304 in a second TMU 210C receives the first texture image, e.g., the decal texture image, and combines it with a second texture image, i.e., the base texture image. For example, dirt marks and scratches can be applied to a textured wall in one execution pass by the TCU 304 by placing the dirt marks and scratches in a translucent texture output from a TCU 304 in the first TMU 210B and blending this texture with the underlying textured wall in a TCU 304 of the second TMU 210C. In conventional systems, one large texture is created. The advantage of separating the images into two textures is that the underlying base wall texture can be a high resolution repeating texture, i.e., many texels per unit length, such as wood or stucco, while the translucent texture can have a low resolution. This combination gives the illusion of having a large non-repeating texture at the high resolution of the underlying texture. In addition, the underlying base wall texture can also be used for other walls, either without a translucent texture or with different translucent textures. As described above, a feature of the present invention is that multiple texture images can be combined in a single execution pass, i.e., one pipelined execution of all of the TMUs 210.

In composite texture mapping if the value of the $F_{blend}$ signal is based on the level-of-detail (LOD) of the image, the signal is either received from the LOD composite factor register 302 via data line 320 or is generated by additional logic based upon values stored in the LOD composite factor register 302. In general, the level-of-detail is a measure of the magnification of the image, or more precisely, is a measure of the number of texels contained in each pixel. Uses of composite blending include creating composite texture images and morphing texture images. When morphing texture images the blending factor is varied in time, resulting is a gradual fade-out of the base texture and a fade-in of the composite texture. One example of texture morphing are images illustrating the transformation of a man into werewolf. A first texture image can be the skin of a man, the second texture can be animal fur. In time, the first texture fades-out and the second texture fades-in creating the image of a werewolf transformation. If the system includes multiple TMUs 210, the system can implement trilinear mipmapping in a single execution pass by compositing two bilinearly filtered texture maps. Each bilinear filtering operation is completed in a separate TMU 210. Alternatively, a single TMU 210 can implement trilinear mipmapping in two execution passes. In a dual TMU model, two TMUs 210 each comprise data which together represent all mipmap levels. For example, one TMU 210B has all odd mipmapping levels. A second TMU 210C has all even mipmapping levels. This is an efficient technique for storing the mipmap levels since each mipmap level is stored only once, i.e., in either the first TMU 210B (odd-level TMU) or the second TMU 210C (even-level TMU). As described above, the LOD signal represents an approximation of the ratio of texel pitch to pixel pitch. A more detailed description of trilinear mipmapping is given in Lance Williams "Pyramidal Parametrics" 17 Computer Graphics (SIGGRAPH 83 PROC.) No. 3, 1–11 (July 1983), that is hereby incorporated by reference in its entirety. In one embodiment of trilinear mipmapping, a mipmap level is equal to the integer value of the LOD signal. However, the magnification or level of detail of an image is frequently between two mipmap levels. Accordingly, the present invention enables two sequential mipmaps to be blended according to the fractional portion of the LOD signal, i.e., frac(LOD), in order to generate an image having a proper texel-pitch/pixel-pitch ratio. Additional details for implementing trilinear mipmapping in the present invention are described below with reference to FIG. 7 and FIG. 8.

As described above, a feature of the present invention is the ability to cascade several identical TMUs 210 in a serial architecture, where each TMU 210 is capable of performing, at least, functions (1) through (11) described above. The multiple serial TMUs 210 enable a plurality of functions to be performed on multiple texture maps, e.g., one texture map per TMU 210, during a single execution pass.

Figure 5:
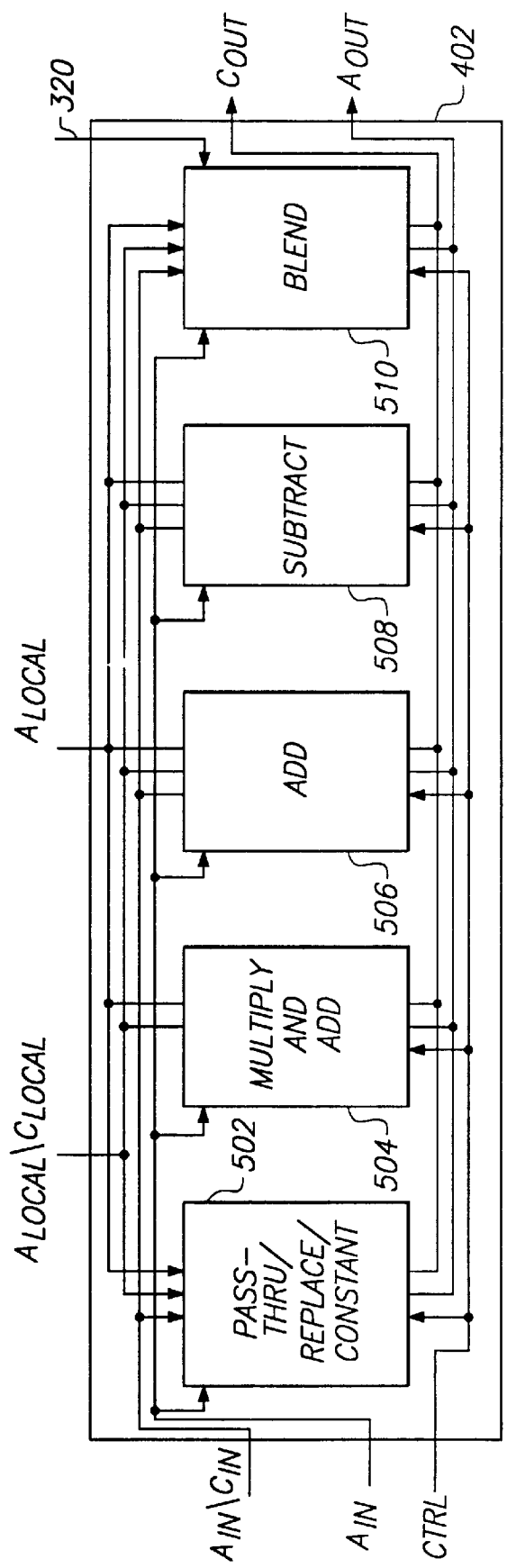
FIG. 5 is an illustration of a texture combine sub-unit according to a first embodiment of the present invention.
Figure 6:
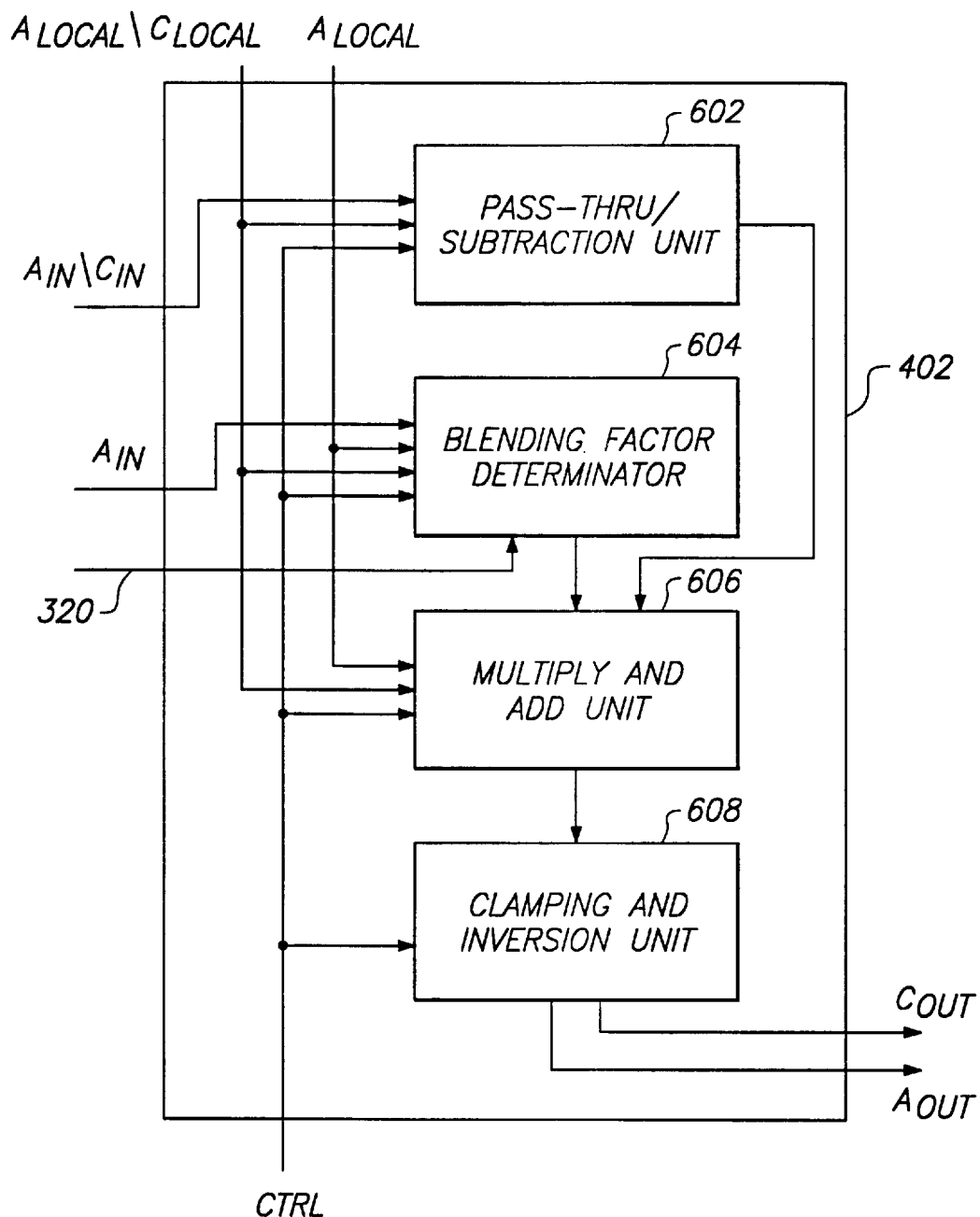
FIG. 6 is an illustration of a texture combine sub-unit according to a second embodiment of the present invention.
Figure 7:
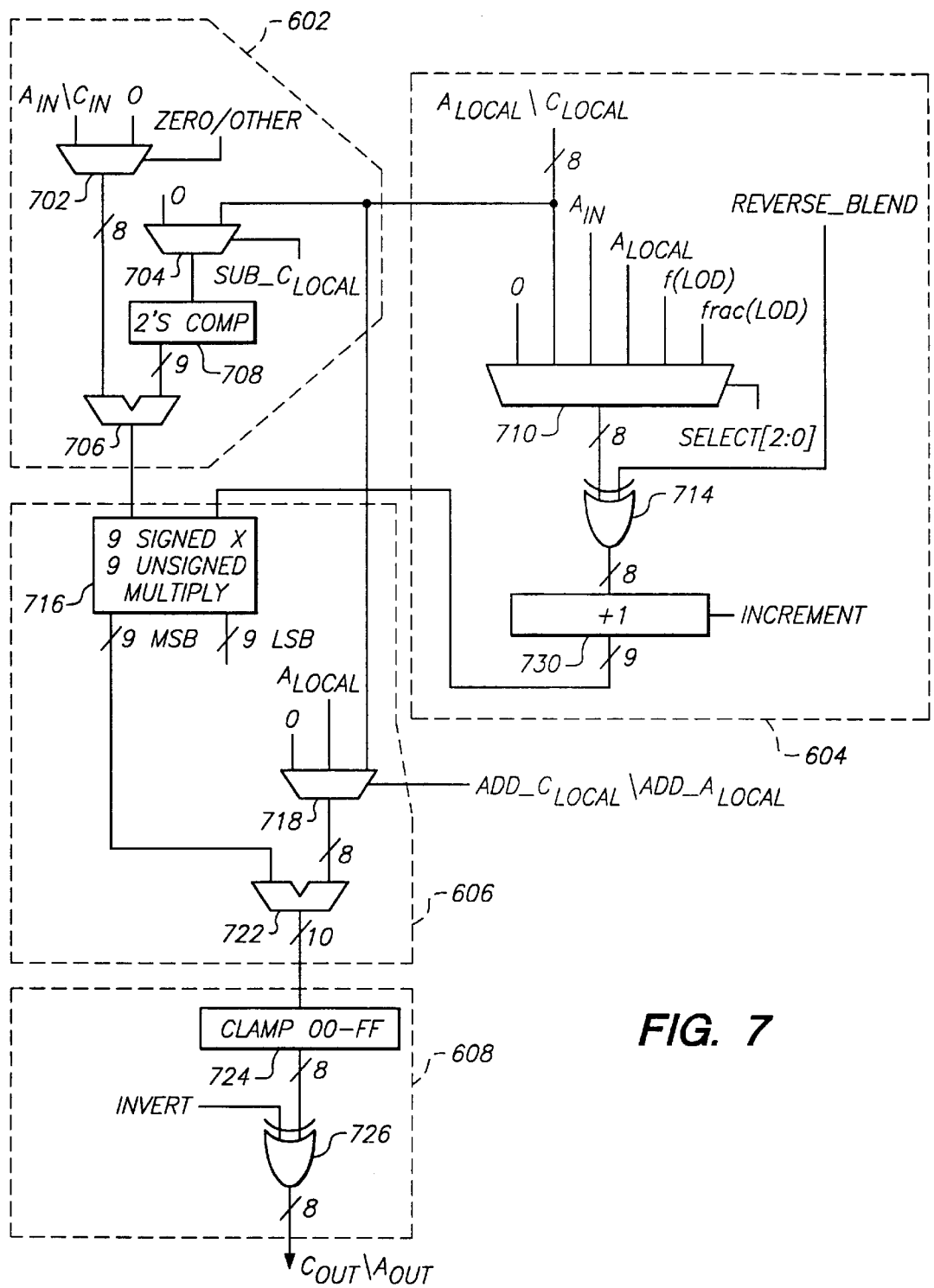
FIG. 7 is an illustration of the logic in a texture combine sub-unit according to the second embodiment of the present invention.

FIG. 5 is an illustration of a texture combine sub-unit 402 according to a first embodiment of the present invention. Each texture combine sub-unit includes several logic units. These logic units include a pass-thru/replace/constant unit 502, a multiply and add unit 504, an add unit 506, a subtract unit 508, and a blend unit 510. Distinct logic can be in each logic unit or the logic can be combined as illustrated in FIGS. 6 and 7. In the TRCU 402A, the TGCU 402B, and the TBCU 402C the data inputs include the texture color input signal $C_{in}$, the texture alpha input signal $A_{in}$, the local texture color signal $C_{local}$, the local texture alpha signal $A_{local}$, and the blend factor $F_{blend}$ received via data line 320. In addition these texture combine sub-units receive the $CTRL_{rgb}$ control signal. As described above with reference to FIG. 4, the data received by the TACU 402D include two local texture alpha signals $A_{local}$, two texture alpha input signals $A_{in}$, and the blend factor $F_{blend}$. That is, in the TACU 402D the $C_{local}$ signal is replaced with an $A_{local}$ signal and the $C_{in}$ signal is replaced with an $A_{in}$ signal. The pass-thru/constant/replace unit 502 receives the input signals and generates either a binary zero signal, a binary one signal, a signal representing $C_{local}$, a signal representing $A_{local}$, a signal representing $C_{in}$, or a signal representing $A_{in}$ based upon the CTRL signal. The multiply and add unit 504 receives the inputs signals and performs a multiply and add operation on the inputs based upon the CTRL signal. The add unit 506 receives the inputs signals and performs an add operation on the inputs based upon the CTRL signal. The subtraction unit 508 receives the inputs signals and performs a subtract operation on the inputs based upon the CTRL signal. The blend unit 510 receives the inputs signals and performs a blending operation on the inputs based upon the CTRL signal. The functions of the texture combine sub-units 402 can be combined, for example, the add unit 506 can be eliminated and additions can be accomplished using only the multiply and add unit 504. In a second embodiment, the logic units are combined as illustrated in FIG. 6 and FIG. 7.

FIG. 6 is an illustration of a texture combine sub-unit 402 according to a second embodiment of the present invention. Each texture combine sub-unit 402 includes four logic units. The logic units are a pass-thru/subtraction unit 602, a blending factor determinator 604, a multiply and add unit 606 and a clamping and inversion unit 608. The data inputs for the TRCU 402A, TGCU 402B, and the TBCU 402C are the same as described above with respect to FIG. 5. That is, $C_{local}$, $A_{local}$, $C_{in}$, $A_{in}$, and $F_{blend}$. The data inputs for TACU 402D are $A_{local}$ (twice), $A_{in}$ (twice), and $F_{blend}$, as described above. An example of the logic within each logic unit is described below with reference to FIG. 7.

FIG. 7 is an illustration of the logic in a texture combine sub-unit 402 according to a second embodiment of the present invention. The pass-thru-subtraction unit 602 includes two multiplexors (MUX) 702, 704, a two's complement operator 708, and an adder 706. The blending factor determinator 604 includes a MUX 710, an exclusive-OR gate 714, and an incrementor 730. The multiply and add unit 606 includes a multiplier 716, a MUX 718, and an adder 722. The clamping and inversion unit 608 includes an 8-bit clamp 724 and an exclusive-OR gate 726. As illustrated in FIG. 7, the logic for implementing the texture combine sub-unit functions are non-exclusive. The implementation of functions (1)–(9) set forth above will be apparent to persons skilled in the relevant art. The implementation of function (10) $(C_{in}-C_{local})*F_{blend}+C_{local}$, and function (11) $(C_{in}-C_{local})*(1-F_{blend})+C_{local}$, are now described.

The implementation of function (10) and function (11) is described below with reference to FIG. 7. The control signal CTRL includes the ZERO/OTHER control signal, the SUB_$C_{LOCAL}$ control signal, the ADD_$C_{LOCAL}$ control signal, the ADD_$A_{LOCAL}$ control signal, the INVERT control signal, the REVERSE_BLEND control signal, the INCREMENT control signal, and the SELECT[2:01] control signal. MUX 702 selects $C_{in}$ based upon control signal ZERO/OTHER. Similarly, MUX 704 selects $C_{local}$ based upon control signal SUB_$C_{LOCAL}$. The two's complement unit 708 performs a two's complement operation on the output of MUX 704. Adder 706 performs an addition operation on the output of 702, i.e., $C_{in}$, and the output of the two's complement unit 708, i.e., a representation of $-C_{local}$ (negative $C_{local}$). Accordingly, the output of adder 704 is $C_{in}-C_{local}$.

The MUX 710 in the blending factor determinator 604 selects one of six inputs (0, $C_{local}$, $A_{in}$, $A_{local}$, f(LOD), and frac(LOD)), based upon the value of the SELECT[2:0] control signal in the blending factor determinator 604. If the texture combine sub-unit 402 is performing a trilinear mipmapping operation, the SELECT[2:0] control signal selects the frac(LOD) signal representing the fractional portion of the LOD value, as described above. If the frac(LOD) signal is selected by the MUX 710 and the blend factor determination operation is occurring in a TCU 304 that is associated with the odd mipmap level and the integer portion of the LOD signal is odd, then the blending factor is equal to frac(LOD). Therefore, the REVERSE_BLEND control signal is equal to a logical zero. Similarly, if the frac(LOD) signal is selected by the MUX 710 and the blend factor determination operation is occurring in a TCU 304 that is associated with the even mipmap level and the integer portion of the LOD signal is even, then the blending factor is equal to frac(LOD) and the REVERSE_BLEND control signal is equal to a logical zero.

If the frac(LOD) signal is selected by the MUX 710 and the blend factor determination operation is occurring in a TCU 304 that is associated with the odd mipmap level and the integer portion of the LOD signal is even, then the blending factor is equal to: 1-frac(LOD). This situation occurs when implementing function (11). Therefore, the REVERSE_BLEND control signal is equal to a logical one and the INCREMENT control signal is equal to a logical one. Similarly, if the frac(LOD) signal is selected by the MUX 710 and the blend factor determination operation is occurring in a TCU 304 that is associated with the even mipmap level and the integer portion of the LOD signal is odd, then the blending factor is equal to: 1-frac(LOD). Therefore, the REVERSE_BLEND control signal is equal to a logical one and the INCREMENT control signal is equal to a logical one. Accordingly, when the REVERSE_BLEND and INCREMENT control signals are high, a two's complement operation is performed on the output of the MUX 710 by the exclusive-OR gate 714 and the incrementor 730 generating the $(1-F_{blend})$ component of function (11). Logic external to the TCU 304 controls the REVERSE_BLEND control signal. The INCREMENT control signal is high when the REVERSE_BLEND control signal is high or when the output of the MUX 710 is not frac(LOD).

The multiplier multiplies the nine bit output of adder 706 and incrementor 730. The output signal of the multiplier represents $(C_{in}-C_{local})*F_{blend}$ for function (10) and $(C_{in}-C_{local})*(1-F_{blend})$ for function (11). The multiplier 716 generates an 18bit output. The nine most significant bits (MSB) are input into adder 722. The second input into adder 722 is the output of MUX 718. The ADD_$C_{LOCAL}$/ADD_$A_{LOCAL}$ signal is set to binary "10" in order for MUX 718 to select the $C_{local}$ signal. Adder 722 adds $C_{local}$ to the output of the multiplier 716. The output of adder 722 is received by the clamping and inversion unit 608. The output of adder 722 is clamped between 00 and FF, i.e., the damper 724 outputs the eight least significant bits. The INVERT signal is equal to zero since no inversion is required to implement either function (10) or function (11). Accordingly, the input and the output of exclusive-OR gate 726 are the same and are equal to $(C_{in}-C_{local})*F_{blend}+C_{local}$ for function (10) and $(C_{in}-C_{local})*(1-F_{blend})+C_{local}$ for function (11).

Figure 8:
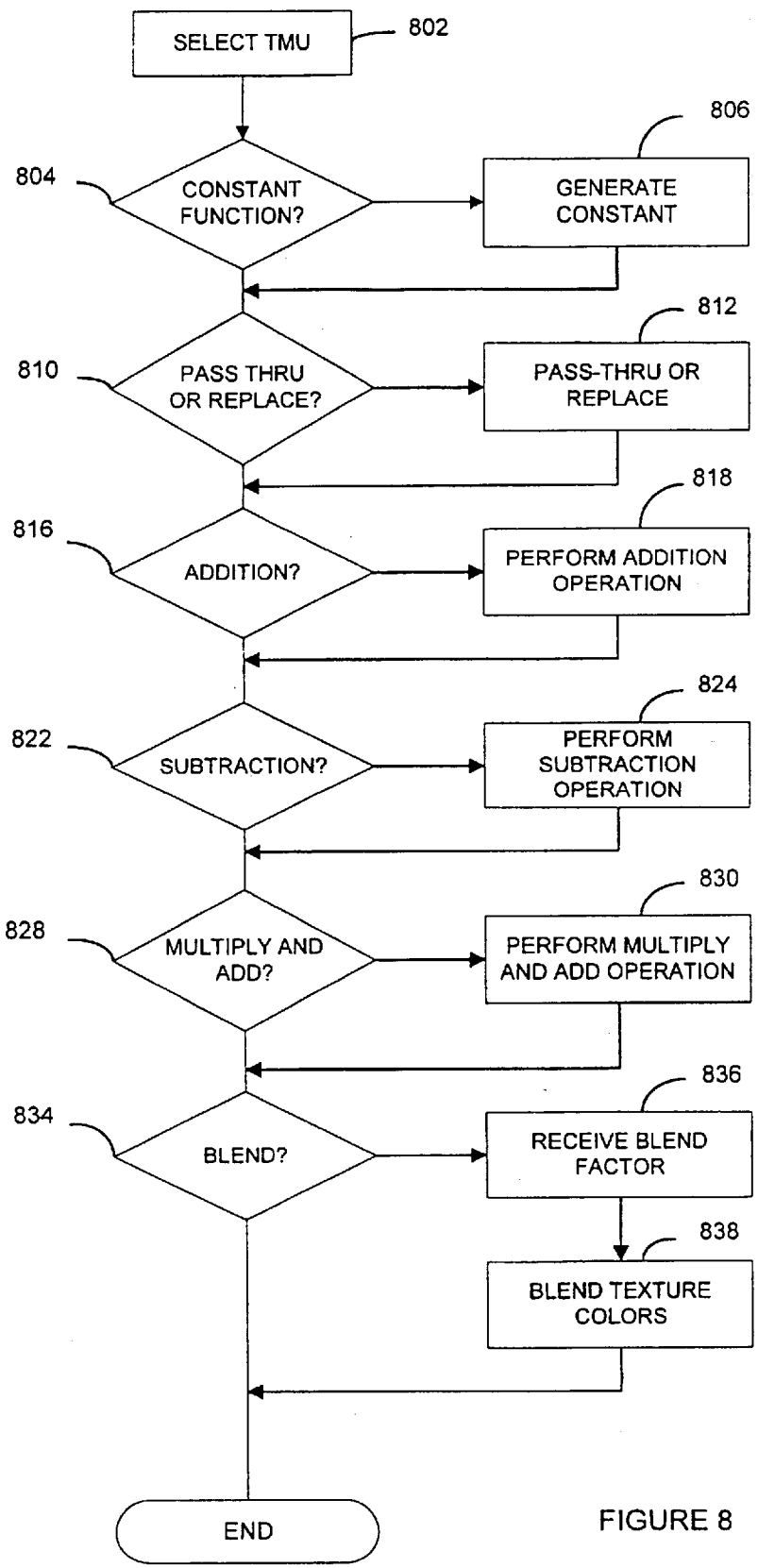
FIG. 8 is a flowchart of the operation of the texture mapping unit according to the present invention.

FIG. 8 is a flowchart of the operation of the TMU 210. A TMU 210 is selected 802. Based upon the control signal CTRL the TCU 304 determines 804 if a constant function is requested. If a constant function is requested, the TCU 304 generates 806 a signal representing the requested constant value. The TCU 304 also determines 810 if a pass-thru or a replace operation is requested based upon the control signal CTRL. If a pass-thru or a replace operation is requested, the TCU 304 generates 812 a signal representing the requested pass-thru or replace operation. The TCU 304 also determines 816 if an addition operation is requested based upon the control signal CTRL. If an addition operation is requested, the TCU 304 generates 818 a signal representing the addition of the selected inputs. The TCU 304 also determines 822 if a subtraction operation is requested based upon the control signal CTRL. If a subtraction operation is requested, the TCU 304 generates 824 a signal representing the subtraction of the selected inputs. The TCU 304 also determines 828 if an multiply and add operation is requested based upon the control signal CTRL. If a multiply and add operation is requested, the TCU 304 generates 830 a signal representing the requested multiply and add operation. The TCU also determines 834 if a blend operation is requested based upon the control signal CTRL. If a blend operation is requested, the TCU 304 receives 836 a blend factor and implements 838 a blending operation to generate a blended signal.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. An apparatus receiving a source image signal and a plurality of texture signals each representing a texture, for combining the source image signal with signals representing at least two of the textures during a single pixel rendering pass, the apparatus comprising:

a first texture composite unit, disposed to receive the source image signal and a first texture signal of the plurality of texture signals, the source image signal and the first texture signal representing independent textures, and a first control signal representing a first relationship between the source image signal and the first texture signal, for combining the source image signal and the first texture signal in accordance with the first relationship to generate a first output texture signal;

a second texture composite unit, disposed to receive the first output texture signal, a second texture signal of the plurality of texture signals, and a second control signal representing a second relationship between the first output texture signal and the second texture signal, for combining the first output texture signal and the second texture signal in accordance with the second relationship to generate a second output texture signal, wherein the second output texture signal is generated from the source image signal, the first texture signal, and the second texture signal in a single pixel rendering pass.

2. The apparatus of claim 1, wherein the second texture composite unit receives the first output texture signal directly from the first texture composite unit.

3. The apparatus of claim 2, wherein the first control signal and the second control signal are the same.

4. The apparatus of claim 2, wherein the first control signal and the second control signal are different.

5. The apparatus of claim 1, wherein additional texture composite units are sequentially connected such that one additional texture signal is combined by each additional texture composite unit during a single pixel rendering pass.

6. The apparatus of claim 1, wherein the source image signal comprises a source image color signal and a source image alpha signal and the first texture signal comprises a first texture color signal and a first texture alpha signal, the apparatus further comprising:

a subtraction unit, having the source image color signal and the first texture color signal as inputs, for subtracting the source image color signal from the first texture color signal.

7. The apparatus of claim 1, wherein the source image signal comprises a source image color signal and a source image alpha signal and the first texture signal comprises a first texture color signal and a first texture alpha signal, the apparatus fiuther comprising:

a multiplication and add unit, for multiplying the first texture signal with one of the source image color signal, the first texture alpha signal, the second texture alpha signal, and a level-of-detail signal, and adding one of the source image color signal and a third signal.

8. The apparatus of claim 1, wherein the source image signal comprises a source image color signal and a source image alpha signal and the first texture signal comprises a first texture color signal and a first texture alpha signal, the apparatus further comprising:

a multiplication unit, for multiplying the first texture color signal and one of the source image color signal, the first texture alpha signal, the second texture alpha signal, and a level-of-detail signal.

9. The apparatus of claim 8, further comprising:
a constant generating unit, for generating a signal representing a predefined value.

10. The apparatus of claim 8, further comprising:
a pass-through unit, coupled to the source image signal, for outputting the source image signal.

11. The apparatus of claim 1, wherein the source image signal and the first texture signal each include four component signals.

12. The apparatus of claim 11, wherein the four component signals include a red color signal, a green color signal, a blue color signal, and an alpha color signal.

13. The apparatus of claim 11, wherein each texture composite unit further comprises four texture combine subunits, each texture combine subunit associated with one of the four component signals, each of the texture combine subunits having a first blend factor determinator, a blending unit, and an addition unit.

14. The apparatus of claim 13, wherein each of the texture combine subunits receives a control signal, and performs at least one of the blend function and the add function in response to the control signal in a single pixel rendering pass.

15. The apparatus of claim 13, wherein two or more of the texture combine subunits receive a first control signal and perform at least one of the blend function and the add function in response to the first control signal in a single pixel rendering pass.

16. The apparatus of claim 1, further comprising a first storage unit coupled to the first texture composite unit and a second storage unit coupled to the second texture composite unit, the first storage unit storing a representation of a first mipmap level, the second storage unit storing a representation of a second mipmap level.

17. The apparatus of claim 16, wherein the first texture composite unit includes:
a first blend factor determinator, for determining a first blend factor, the first blend factor representing a blending relationship between the source image signal and the first texture signal;
a first blending unit, coupled to the first blend factor determinator, for blending the source image signal and the first texture signal based upon the first blend factor; and
a first addition unit, having the source image signal and the first texture signal as inputs, for adding the first output texture signal and the first texture signal.

18. The apparatus of claim 17, wherein the blending factor is equal to a selected composite factor representing one of the first mipmap level and a mid-level mipmap level between the first mipmap level and the second mipmap level, the source image color signal representing the first mipmap level, the first texture color signal representing the second mipmap level.

19. The apparatus of claim 17, wherein a texture effect is indicated by either or both of the first control signal and the second control signal.

20. The apparatus of claim 19, wherein the texture effect is one or both of specular light reflections and diffuse light reflections.

21. A computer based method for combining at least two texture signals, in a single pixel rendering pass, the computer having a first texture composite unit and a second texture composite unit, comprising the steps of:
(a) receiving a source image signal;
(b) receiving a first texture signal representing an independent texture;
(c) receiving a first control signal representing a first relationship between the source image signal and the first texture signal; and
(d) combining the source image signal and the first texture signal in accordance with the first relationship to generate a first output texture signal;
(e) receiving a second texture signal;
(f) receiving a second control signal representing a second relationship between the first output texture signal and the second texture signal; and
(g) combining the first output texture signal and the second texture signal in accordance with the second relationship to generate a second output texture signal;
wherein the second output texture signal is generated from the source image signal, the first texture signal, and the second texture signal in a single pixel rendering pass.

22. The method of claim 21, wherein the first and second control signals are the same.

23. The method of claim 21, wherein the first and second control signals are different.

24. The method of claim 21, wherein steps (e)–(g) are sequentially repeated for each generated output texture signal and additional texture signals such that one additional texture is combined by each repetition of steps (e)–(g) during a single pixel rendering pass.

25. The method of claim 21, wherein the second relationship can be represented by at least one of a blending operation, a multiplication operation, a subtraction operation, and an additional operation.

26. The method of claim 21, further comprising the steps of:
determining a blend factor representing a relationship between the source image signal and the first texture signal; and
performing one of a blending operation and an addition operation in a single texture rendering pass in response to the second control signal, the blending operation combining the source image signal and the first texture signal according to the blend factor, the addition operation adding the source image signal to the first texture signal to generate the first texture output signal.

27. The method of claim 26, further comprising the step of:
performing a subtraction operation on the source image signal and the first texture signal in response to the first control signal.

28. The method of claim 26, wherein the source image signal comprises a source image color signal and a source image alpha signal, the first texture signal comprises a first texture color signal and a first texture alpha signal, the second texture signal comprises a second texture color signal and a second texture alpha signal, and further comprising the step of:
performing a multiplication operation on the first texture color signal and one of the source image color signal, the source image alpha signal, the first texture alpha signal, and a level-of-detail signal in response to the first control signal.

29. The method of claim 26, further comprising the step of:
generating one of a binary one signal and a binary zero signal in response to the first control signal.

* * * * *

UNITED STATES PATENT AND TRADEMARK OFFICE
CERTIFICATE OF CORRECTION

| | | |
|---|---|---|
| PATENT NO. | : 5,870,102 | Page 1 of 1 |
| APPLICATION NO. | : 09/057329 | |
| DATED | : February 9, 1999 | |
| INVENTOR(S) | : Tarolli et al. | |

It is certified that error appears in the above-identified patent and that said Letters Patent is hereby corrected as shown below:

Col. 3, line 45, please replace "fiurther" with -- further --;
Col. 5, line 47, please replace "a.nd" with -- and --;
Col. 5, line 49, please add -- memory -- before "212C" and after "texture";
Col. 5, line 56, please replace "alapha" with -- alpha --;
Col. 6, line 1, please replace "e.g. TMU 210." with -- e.g. TMU 210B. --;
Col. 7, line 20, please replace "on line signal 216" with -- signal on line 216 --;
Col. 9, line 48, please replace "inputs signals" with -- input signals --;
Col. 9, line 50, please replace "inputs signals" with -- input signals --;
Col. 9, line 52, please replace "inputs signals" with -- input signals --;
Col. 11, line 25, please replace "damper" with -- clamper --.

Col. 12, line 52, please replace "fiurther" with -- further --.

Signed and Sealed this
Twenty-first Day of June, 2011

David J. Kappos
*Director of the United States Patent and Trademark Office*